Dec. 19, 1961     C. C. PARTON ET AL     3,013,390
FLUID TRANSMISSION
Filed Aug. 15, 1960
*fig -1-*
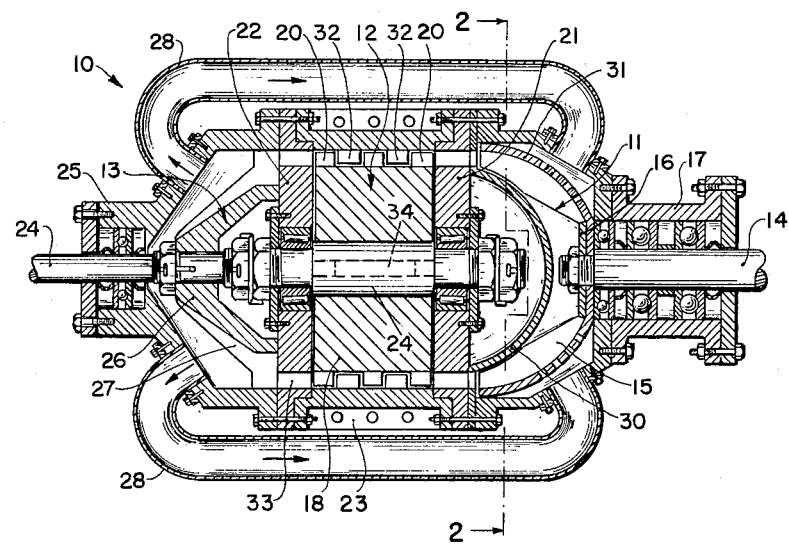
*fig -2-*
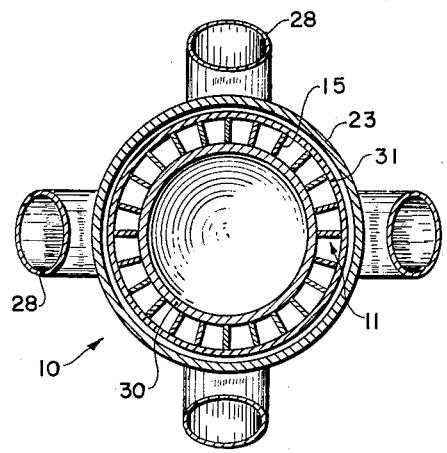
*INVENTORS.*
CLARENCE C. PARTON
HERBERT D. KINARD
BY Francis W. Young
ATTORNEY

United States Patent Office 3,013,390
Patented Dec. 19, 1961

3,013,390
FLUID TRANSMISSION
Clarence C. Parton, 286 Charlotte St., and Herbert D. Kinard, 96 Beverly Road, both of Asheville, N.C.
Filed Aug. 15, 1960, Ser. No. 49,642
3 Claims. (Cl. 60—54)

The present invention relates in general to fluid or hydraulic transmissions and more particularly to a composite and compact fluid pump and torque convertor especially useful as the final drive on powered vehicles of all types.

Vehicles of the class herein under consideration, such as automobiles, trucks, tractors, etc., have in the past been provided with three main or primary elements heretofore thought to be essential for satisfactory, flexible operation. These elements consist of course of a prime mover or motor, a transmission for reducing or controlling the revolutions of the prime mover, and a differential for permitting the driven wheels to rotate at differing speeds although driven from the same prime mover.

Conventional or known vehicle drives are beset with many disadvantages. For example, the three elements enumerated above contain hundreds of moving parts, the inertia of which must be overcome both in acceleration and deceleration, the lubrication of which is a constant problem, and the repair and maintenance of which is an often too-frequently occurring demand on economy and skill of the owner or his agent. Moreover, and more importantly, conventional transmissions and differentials are of renowned inefficiency with the concomitant result that the contemporary prime mover is greatly overtaxed unless the same is initially provided with hundreds of horsepower. Additionally, transmissions of this type usually must be accompanied with a separate braking system.

In order to overcome the known disadvantages of the aforesaid three-element drive means, only some of which are mentioned above, it has been proposed in the past to combine the transmission and differential into a single unit and thereby eliminate one element entirely. Early discussions of this proposal appear, for example, in U.S. Patent No. 1,175,605, which issued on March 14, 1916, to J. Cloos, and in U.S. Patent No. 1,608,502, which was patented on November 30, 1926, in the name of A. W. Grote.

Although the fluid transmissions discussed, for example in the two aforesaid patents clearly relate to the problems herein under consideration, the solutions therein proposed obviously are impractical as evidenced by their absence on the market and by the fact that the industry continues to be burdened with the problem. The significant fault with those earlier designs appears to be in the failure to provide for an increase in torque to be substituted for the eliminated gears and gear ratios in the transmission and differential.

A primary object of this invention is to provide a fluid transmission not having the disadvantages of heretofore known transmissions of either the mechanical or fluid types.

Another object of the present invention is to provide a transmission-torque convertor of sufficiently increased efficiency to permit operation on very low power inputs and with very little power loss.

Still another object of this invention is to provide a fluid transmission-torque convertor having a minimum of moving parts, which is continuously self-lubricating, and which therefore can be operated for considerably longer periods of time than those presently available.

A more important object of the present invention is to provide a combined fluid transmission-torque convertor of sufficient power/size ratio as to permit conversion of existing power trains with a minimum of effort and modification.

Another object of this invention is to provide a torque convertor with improved fluid pump or impeller means in order to obtain a very high operating efficiency.

Still another object of the present invention is to provide a fluid transmission-torque convertor with a fluid flow passage capable of delivering more useful work from any given amount of fluid passed therethrough, or with a maximum of work-producing fluid flow.

An additional object of this invention is to provide a torque convertor-fluid transmission which can be used not only for accelerating but for decelerating or braking any vehicle to which the same is attached.

Another object of the present invention is to provide a compact, air cooled, torque convertor of extreme versatility.

These objects may be accomplished, in accordance with the present invention, with a fluid turbine having blades so disposed radially as to produce a high moment arm with consequent high torque at all speeds, by providing very short and closed fluid circulation paths, and by introducing the fluid to the impeller and to the turbine blades in a substantially unobstructed and rectilinear path.

Other objects and advantages of this invention will become apparent to those skilled in this art upon study of the following detailed description thereof, taken in conjunction with the accompanying drawings, wherein:

FIGURE 1 is an elevational view, in cross-section, of a fluid transmission-torque convertor constructed in accordance with this invention, with only portions being shown of the drive (input) and driven (output) shafts; and FIGURE 2 is a section of the apparatus taken along the line 2—2 of FIGURE 1, and showing in particular the fluid recirculation and cooling conduits as well as the impeller or pump blades.

With attention now directed to the drawings, wherein like parts are identified by like reference numerals, the torque convertor or fluid transmission is indicated generally by numeral 10. This device consists mainly of an impeller or pump section 11, a turbine section 12, and a fluid discharge section 13, also shown generally.

A drive shaft 14, which may be attached in any known manner to a prime mover or motor, projects into the pump section 11 and is rigidly attached to impeller blades 15 by conventional means, such as the nut shown. There are twenty-four of the blades 15 shown, although the exact number is not critical to operation. These blades spiral outwardly from the shaft plate 16, to which they are secured, somewhat in a circumferential direction. The outermost end of the blades 15 of course trail the innermost portions during operation in order to provide the pumping effect desired.

Drive shaft 14 is suitably journalled for rotation in the input housing 17 by the use of bearings and seals. Thrust type bearings are desired since reaction of the impeller blades on fluid being circulated thereby will produce a force axially of the drive shaft. Inasmuch as the apparatus shown operates on a closed fluid system, it is very important that the seals used prevent fluid leakage. Suitable ports, not shown, of course will be provided for fluid filling and for draining of the apparatus.

The turbine section 12 is provided with a rotor 18 having a number of rows of rotor blades 20 secured to the peripheral surface thereof. The rotor is journalled for rotation in bearings supported within respective end plates 21, 22, which end plates are non-rotatably secured to the main housing 23. Driven or output shaft 24 is suitably keyed, by conventional means 34, to the rotor 18 and therefore rotates therewith. The output shaft is journalled in output housing 25 somewhat in the same manner as input shaft 14, discussed above, although less shaft sealing is required because the highest fluid pressures of course occur at the pump end of the torque convertor.

The fluid discharge section 13 consists of a cup-shaped element or discharge cup 26 having a plurality of tapered vanes 27 formed on the periphery thereof. The vanes 27 may be spiraled in the manner of impeller blades 15, or straight, and function to discharge fluid from within the housing 23 to the four recirculation conduits 28. It is preferred, however, that the vanes 27 be set at the same angle and directly in line with the rotor blades 20 so that fluid discharging from the rotor will be swept directly toward the recirculation system. It will be seen from inspection of FIGURE 1 that discharge blades 27 taper from a wide section adjacent end plate 22 to a narrow portion adjacent the coupling for sections of shaft 24. The cup 26 must be driven along with the rotor and accordingly is also keyed to shaft 24 for rotation therewith. Alternatively, of course, the shaft 24 may be provided in sections with the innermost section formed integral with the rotor 18. Although four of the recirculation conduits 28 have been shown, it will be obvious that others may be provided, or that a fewer number would suffice. It is important, however, that the combined conduits have sufficient capacity to recirculate fluid contained within the torque converter without restricting the fluid passage therethrough. The vanes 27 of course rotate with cup 26, and the rotor 18, cup 26 and shaft 24 are driven in response to circulation of fluid by drive shaft 14 and impeller blades 15.

Attention is directed to the fact that the conduits 28 extend radially outwardly of the housing 23, as shown in FIGURE 2. The purpose for this arrangement is to permit circulation of air over all of the outer conduit surfaces in order to facilitate and even to promote cooling, since any energy expelled through heat obviously reflects a reduction in overall efficiency of the apparatus. The conduits are attached to main housing 23 as shown and receive fluid from the low pressure or discharge section 13 and deflect the same with a minimum of disturbance in flow pattern to the high pressure or pump section 11. Fluid is expelled through the conduits, of course, by virtue of additional fluid being pumped by the driven impeller blades 15.

In order to reduce turbulence, hemispherical cap 30 is mounted coaxially of the rotor at the pump or impeller section 11 of the torque convertor. A conoidal shaped cover plate 31 is mounted onto and rotates with shaft 14 coaxially of rotor 18 at the pump section 11 and is disposed on the opposite side of impeller blades 15 from the cap 30, as shown. The cap 30 and cover plate 31 define the space within which the blades 15 pump fluid. This space or zone, as shown, tapers toward the discharge end of blades 15 in order to produce acceleration in the flow of fluid pumped therethrough. That portion of cover plate 31 adjacent or in alignment with the discharge ends of conduits 28 is perforated or ported, as shown in FIGURE 1, to permit passage of recirculated fluid from the conduits back into the path of rotating impeller blades 15, which action of course forces the fluid back into the zone occupied by rotor blades 20 to produce more work at output shaft 24. Additional support for blades 15 is obtained by securing the same to rotating cover plate 31.

The main housing 23 is provided with rows of stator blades 32, the blades in each row of which correspond in number to the rotor blades 20, but which are set at reverse angles, to deflect fluid emerging from one set of rotor blades against subsequent sets, as is known in this field. Moreover, the end plates 21, 22 are also provided with directionalized ports 33 to accomplish the same purpose. The coaxially disposed pump consisting of drive shaft 14 and impeller blades 15, as well as the proximity of blade tips and alignment thereof with the rotor blades, permits pressure build-up in the pump section and transmittal of this pressure with very little loss to the rotor blades. Moreover, inasmuch as conduits 28 discharge substantially in alignment with the rotor blades, the apparatus therefore utilizes both the newly-added pressure and the velocity or momentum of the recirculated fluid, which of course contributes to overall efficiency.

In order to explain further the operation of this invention, it will be assumed that a prime mover such as a gasoline engine is attached to and thereby rotates drive shaft 14, impeller blade 15, as well as cover plate 31, and that the entire apparatus is filled with fluid, such as oil. At idle speeds, rotation of impeller blades 15 will be insufficient to produce rotation at output shaft 24 if there is any mass at all connected thereto, and the rotor 18, rotor blades 20 and cup 26 will remain stationary.

Any increase in r.p.m. of the prime mover and impeller blades will, however, provide sufficient circulation of fluid through the rotor blades 20, stator blades 32, ports 33, vanes 27, and conduits 28 to cause deflection of the rotor blades and consequent rotation of the output shaft 24. Because of the unimpeded flow of fluid from the conduits 28 back into impeller blades 15 and thereafter in a rectilinear path directly into the turbine proper, very little effective energy is lost and the apparatus therefore is highly efficient. The distance from the work zone, or that zone occupied by the rotor blades, to the axis of rotation should be chosen to provide for high torque regardless of speed. Consequently, the input torque at shaft 14 may in fact be multiplied to such an extent that power inputs of conventional magnitude may be reduced considerably.

When the vehicle is coasting, as when traveling on a downgrade, the engine may be set at idle in which case heretofore driven shaft 24 will drive rotor 18 and thereby produce work on the fluid. Any work required to circulate the fluid of course will result in braking of the shaft 24. A simple forward-reverse gear selector may be provided and each assembly may be equipped with a direct 1 to 1 gear ratio. There need be no provision for changing this gear ratio, either forward or reverse, since the vehicle speed will be directly proportional to the engine revolutions at all speeds.

It is contemplated that each vehicle be provided with two of the above-described torque convertors, one for each driven axle. Inasmuch as the fluid flow will permit slight slippage, the need for a differential between driven axles is eliminated. If desired, however, this unit may be substituted for the conventional transmission, in which case a differential might be required.

It is also contemplated that the torque convertor, fluid transmission hereinabove described not be limited in use to road vehicles but that the same be used in all applications involving a necessity for high torque and variable speeds. The end use, therefore, will be limited only by the imagination of the owner.

Inasmuch as various modifications will become apparent to those skilled in the art, it is intended that the present invention be limited only to the extent set forth in the following claims.

What is claimed is:

1. A fluid transmission, torque convertor comprising a main housing, a rotor having spaced rows of blades on the periphery thereof mounted for rotation in said housing, said housing having rows of stator blades secured thereto and disposed between and in alignment with successive rows of rotor blades, a rotatable drive shaft mounted coaxially of said rotor, a plurality of elongated impeller blades each having a fluid inlet end secured to said drive shaft for rotation therewith and a fluid outlet end, said latter end of each impeller blade being disposed in alignment with said rotor and stator blades, means providing additional support for and enclosing said elongated impeller blades and defining a cross-sectional area which is reduced progressively toward the fluid outlet end, ports in one of said area defining means overlying the inlet end of said impeller blades for the introduction of fluid, a discharge cup having vanes mounted coaxially of and to said rotor at an end thereof opposite said impeller blades, a plurality of fluid circulation conduits extending outside said main housing and forming therewith a closed fluid circulation system, said conduits having one end connected to said housing adjacent the vanes of said discharge cup and another end connected to said housing adjacent the inlet end of said impeller blades, whereby upon rotation of said drive shaft by a prime mover fluid contained within said closed circulation system is forced by said impeller blades alternately into said rows of rotor and stator blades and by the vanes on said discharge cup into and through said conduits back into said impeller blades thereby causing rotation of said rotor, and a driven shaft connected to said rotor for rotation therewith.

2. A fluid transmission, torque convertor as set forth in claim 1 wherein each of said impeller blades spirals from the inlet end to the outlet end so that during rotation the outlet end of each blade trails the inlet end.

3. A fluid transmission, torque convertor as set forth in claim 2 wherein the vanes on said discharge cup are spiraled in a direction similar to that of said impeller blades to pump fluid from the discharge end of said rotor into the recirculation conduits.

References Cited in the file of this patent
UNITED STATES PATENTS

| | | |
|---|---|---|
| 2,338,404 | Carroll | Jan. 4, 1944 |
| 2,640,680 | Altheide | June 2, 1953 |
| 2,750,745 | Thompson | June 19, 1956 |